(12) United States Patent
Dong et al.

(10) Patent No.: US 11,515,551 B2
(45) Date of Patent: Nov. 29, 2022

(54) FUEL CELL RECOVERY CONTROL SYSTEM AND METHOD

(71) Applicants: Hyundai Motor Company, Seoul (KR); Kia Motors Corporation, Seoul (KR)

(72) Inventors: Hyun Bae Dong, Gyeonggi-do (KR); Won Jung Kim, Seoul (KR); Yong Doo Son, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 423 days.

(21) Appl. No.: 16/663,709

(22) Filed: Oct. 25, 2019

(65) Prior Publication Data

US 2020/0381756 A1 Dec. 3, 2020

(30) Foreign Application Priority Data

May 29, 2019 (KR) .................. 10-2019-0063270

(51) Int. Cl.
| | |
|---|---|
| *H01M 8/04* | (2016.01) |
| *H01M 8/04858* | (2016.01) |
| *H01M 8/04537* | (2016.01) |
| *H01M 8/04992* | (2016.01) |
| *H01M 8/04082* | (2016.01) |
| *H01M 8/04746* | (2016.01) |

(52) U.S. Cl.
CPC ... *H01M 8/04932* (2013.01); *H01M 8/04201* (2013.01); *H01M 8/04552* (2013.01); *H01M 8/04611* (2013.01); *H01M 8/04753* (2013.01); *H01M 8/04992* (2013.01)

(58) Field of Classification Search
CPC ......... H01M 8/04932; H01M 8/04201; H01M 8/04552; H01M 8/04611; H01M 8/04753
See application file for complete search history.

(56) References Cited

U.S. PATENT DOCUMENTS

| | | | |
|---|---|---|---|
| 9,299,998 B2 * | 3/2016 | Chun | H01M 8/04179 |
| 9,509,004 B2 * | 11/2016 | Jomori | H01M 8/04951 |
| 10,158,134 B2 * | 12/2018 | Matsusue | H01M 8/04611 |
| 2015/0372329 A1 * | 12/2015 | Jomori | H01M 8/043 429/432 |
| 2019/0051917 A1 * | 2/2019 | Kitao | H01M 8/04671 |
| 2020/0067119 A1 * | 2/2020 | Ito | H01M 8/2495 |
| 2020/0203739 A1 * | 6/2020 | Kaneko | H01M 8/04582 |
| 2020/0251761 A1 * | 8/2020 | Kaneko | H01M 8/0441 |

FOREIGN PATENT DOCUMENTS

| | | |
|---|---|---|
| JP | 2011119046 A | 6/2011 |
| JP | 2012174673 A | 9/2012 |
| KR | 101136502 B1 | 4/2012 |
| KR | 20120065889 A | 6/2012 |

(Continued)

*Primary Examiner* — Amanda C. Walke
(74) *Attorney, Agent, or Firm* — Fox Rothschild LLP

(57) ABSTRACT

A fuel cell recovery control system and method are provided to supply hydrogen to the cathode of a fuel cell stack to remove an oxide film formed on a platinum surface of the cathode. The performance of the fuel cell stack is recovered in accordance with the oxide film removal. In addition, electric power generated during the performance recovery of the fuel cell stack is consumed in an inverter and, as such, overcharge of a battery is prevented.

11 Claims, 3 Drawing Sheets

(56) References Cited

FOREIGN PATENT DOCUMENTS

| KR | 20140017364 A | 2/2014 |
| KR | 101448991 B1 | 10/2014 |
| KR | 20150043181 A | 4/2015 |
| KR | 20150068676 A | 6/2015 |
| KR | 20160007816 A | 1/2016 |

* cited by examiner

FUEL CELL RECOVERY CONTROL SYSTEM AND METHOD

CROSS-REFERENCE TO RELATED APPLICATION

This application claims priority to Korean Patent Application No. 10-2019-0063270, filed on May 29, 2019, the disclosure of which is incorporated herein by reference.

BACKGROUND

1. Field of the Invention

The present invention relates to a system and a method for controlling recovery of a fuel cell through removal of an oxide film using an inverter.

2. Description of the Related Art

Generally, a fuel cell includes a membrane electrode assembly (MEA) having a catalyst layer to induce reaction between hydrogen and oxygen, and separation plates disposed at opposite sides of the MEA to supply hydrogen and air to the interior of the MEA while allowing discharge of water from the MEA. A plurality of fuel cells, each of which includes an MEA and a pair of separation plates to selectively supply hydrogen or oxygen to opposite surfaces of the MEA, respectively, are laminated to form a fuel cell stack.

An anode and a cathode, which form inner electrodes of such the fuel cell stack, contain carbon and platinum. As is known, the fuel cell stack exhibits degraded performance after operation for a particular period of time due to degradation of carbon and platinum as mentioned above. In other words, during operation of fuel cells, platinum catalysts may exhibit a reduction in electrochemical surface area due to aggregation of platinum nanoparticles having a size of several nanometers or dissolution of platinum itself. As a result, the oxygen reduction reaction (ORR) rate of the cathode may be reduced, thereby resulting in degradation in the overall performance of the fuel cell stack.

In particular, in the fuel cell stack, hydrogen ions produced at the anode migrate to the cathode after passing through an electrolytic membrane. Hydrogen ions migrating to the cathode react electrochemically with oxygen contained in oxidizing gas supplied to the cathode and, as such, reduction reaction of oxygen occurs. As a result, an oxide film is coated over the surfaces of the platinum catalysts of the catalyst layer and, as such, reaction resistance may increase and electricity generation efficiency may be degraded.

The above matters disclosed in this section are merely for enhancement of understanding of the general background of the invention and should not be taken as an acknowledgement or any form of suggestion that the matters form the related art already known to a person skilled in the art.

SUMMARY

Therefore, the present invention provides a system and a method for controlling recovery of fuel cells based on removal of an oxide film formed on a platinum surface in a fuel cell stack including the fuel cells through supply of hydrogen to a cathode of the fuel cell stack.

In accordance with an aspect of the present invention, a fuel cell recovery control system may include a valve module configured to selectively adjust supply and discharge of hydrogen fuel or oxygen fuel associated with a fuel cell configured to generate electric power using hydrogen fuel or oxygen fuel; an inverter configured to convert electric power generated from the fuel cell; a system unit configured to selectively supply the electric power converted by the inverter to an external supply site; and a controller configured to determine whether removal of an oxide film from the fuel cell should be executed, based on the electric power generated from the fuel cell, operate the valve module in response to determining execution of oxide film removal, to prevent supply and discharge of oxygen fuel associated with the fuel cell, operate the inverter to perform electric power conversion, and operate the system unit to prevent the electric power converted by the inverter from being supplied to the external supply site.

The controller may be configured to determine whether an output converted by the inverter through conversion of electric power supplied to the inverter after being generated from the fuel cell is equal to or less than a predetermined value, and determine execution of oxide film removal when the output through the electric power conversion in the inverter is equal to or less than the predetermined value. When electric power conversion of the inverter is executed by the controller based on execution of oxide film removal determined by the controller, the inverter may be configured to perform electric power consumption through conversion of the electric power supplied from the fuel cell.

The controller may be configured to receive, as an input thereof, information regarding a voltage of the electric power generated from the fuel cell from a voltage sensor after execution of oxide film removal, and stop execution of oxide film removal when the voltage of the generated electric power is equal to or greater than a predetermined reference voltage value, and may be configured to perform control to normally operate the fuel cell. When the voltage of the electric power generated from the fuel cell is equal to or greater than the predetermined reference voltage value, the controller may be configured to operate the inverter to operate normally, and operate the valve module to be opened for supply and discharge of oxygen fuel associated with the fuel cell.

When the inverter is operated by the controller, to operate normally, the inverter may be configured to convert the electric power supplied from the fuel cell into an output value as electric power to be supplied to the external supply site. The controller may be configured to periodically perform, at intervals of a predetermined period of time, the determination of whether oxide film removal should be executed.

In accordance with another aspect of the present invention, a fuel cell recovery control method may include determining whether oxide film removal from a fuel cell should be executed, based on electric power generated from the fuel cell, and preventing supply and discharge of oxygen fuel based on the fuel cell in response to determining execution of oxide film removal, and converting electric power generated from the fuel cell through an inverter while preventing the electric power converted through the inverter from being supplied to an external supply site.

The method may further include determining whether an output converted by the inverter through conversion of the electric power supplied to the inverter after being generated from the fuel cell is equal to or less than a predetermined value, and determining execution of oxide film removal when the output converted by the inverter through the electric power conversion is equal to or less than the predetermined value.

The fuel cell recovery control method may further include detecting for receiving information regarding a voltage of electric power generated from the fuel cell after execution of oxide film removal in the recovery, and normal driving for stopping execution of oxide film removal when the voltage of the electric power generated from the fuel cell is equal to or greater than a predetermined reference voltage value, and then driving the fuel cell to operate normally. When the voltage of the electric power generated from the fuel cell is greater than the predetermined reference voltage value, the inverter may be operated normally, and supply and discharge of oxygen fuel may be executed in association with the fuel cell.

In accordance with the fuel cell recovery control system and method configured as described above, hydrogen may be supplied to the cathode of the fuel cell stack to remove an oxide film formed on the platinum surface of the cathode. Accordingly, the performance of the fuel cell stack may be recovered in accordance with the oxide film removal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Reference will now be made in detail to the exemplary embodiments of the present invention associated with a system for controlling recovery of a fuel cell, examples of which are illustrated in the accompanying drawings. Wherever possible, the same reference numbers will be used throughout the drawings to refer to the same or like parts.

Figure 1:
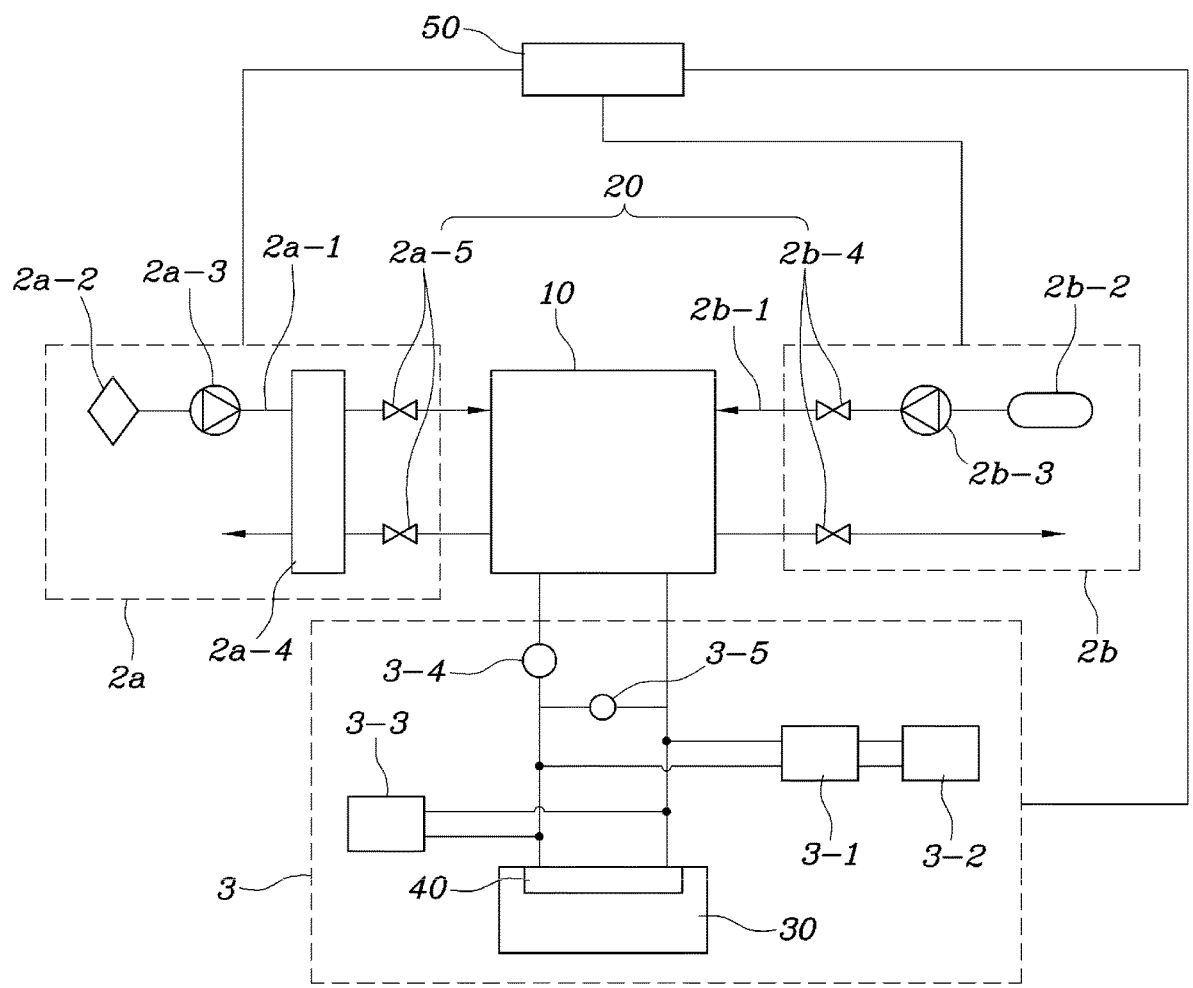
FIG. 1 is a diagram illustrating a configuration of a system for controlling recovery of a fuel cell in accordance with an exemplary embodiment of the present invention.
Figure 2:
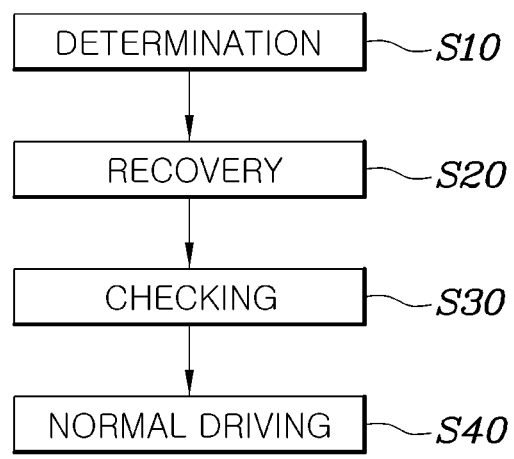
FIGS. 2 and 3 are flowcharts illustrating a method for controlling recovery of a fuel cell in accordance with an exemplary embodiment of the present invention.
Figure 3:
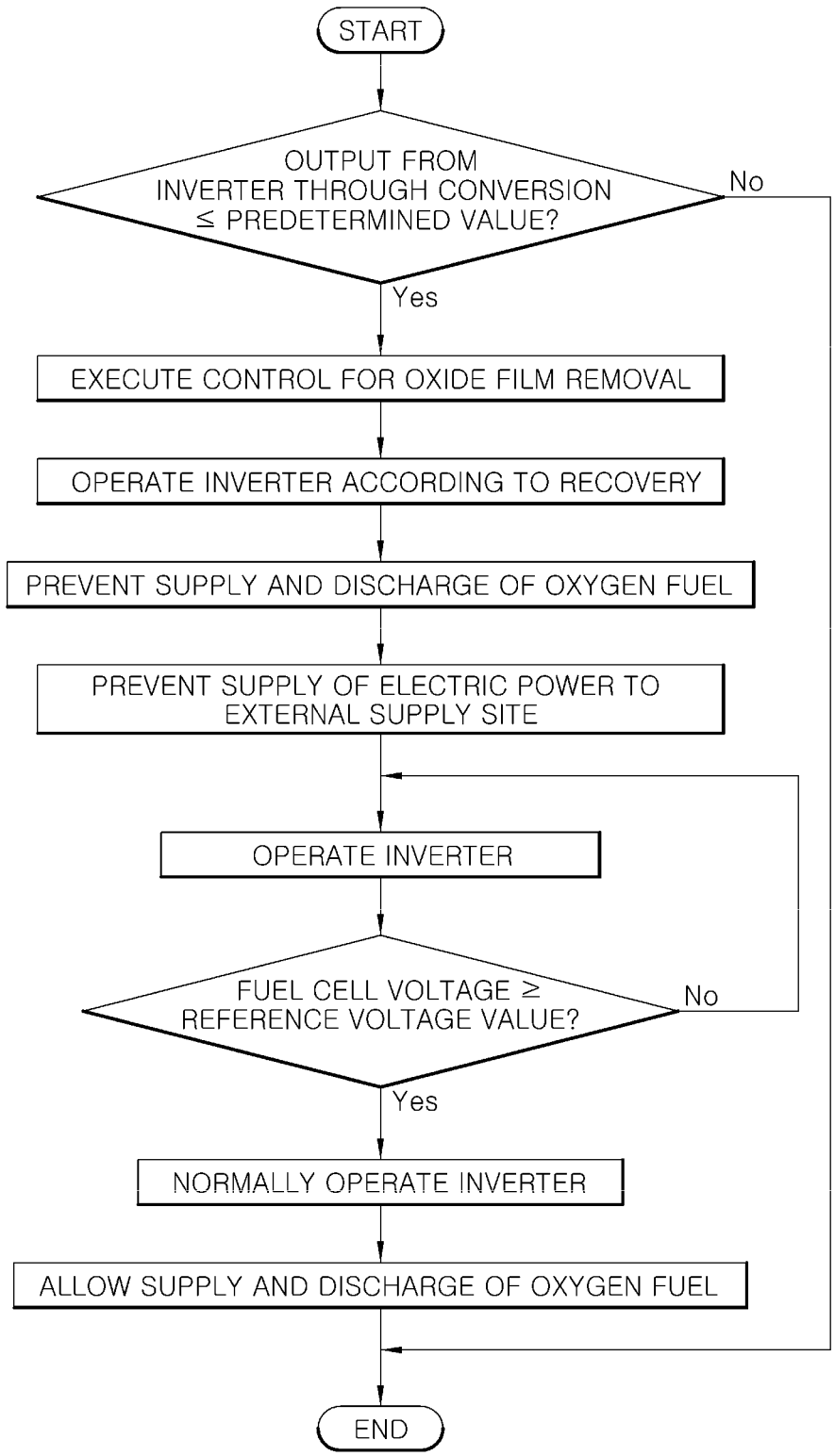

FIG. 1 is a diagram illustrating a configuration of a system for controlling recovery of a fuel cell in accordance with the present invention. FIGS. 2 and 3 are flowcharts illustrating a method for controlling recovery of a fuel cell in accordance with the present invention.

As illustrated in FIG. 1, the fuel cell recovery control system according to the present invention may include a valve module 20 configured to selectively adjust supply and discharge of hydrogen fuel or oxygen fuel associated with a fuel cell 10 configured to generate electric power using hydrogen fuel or oxygen fuel; an inverter 30 configured to convert the electric power generated from the fuel cell 10; a system unit 40 configured to selectively supply electric power converted by the inverter 30 to an external supply site; and a controller 50 configured to determine whether removal of an oxide film from the fuel cell 10 should be executed, based on the electric power generated from the fuel cell 10, operating the valve module 20 in response to determining execution of oxide film removal, to prevent supply and discharge of oxygen fuel associated with the fuel cell 10, operate the inverter 30 to perform electric power conversion, and operate the system unit 40 to prevent the electric power converted by the inverter 30 from being supplied to the external supply site.

In particular, the fuel cell 10 may include a plurality of laminated cells, and generates electric power through chemical reaction between a hydrogen pole and an oxygen pole. Meanwhile, the external supply site may be a building or similar type of structure. A plurality of fuel cells 10 may be provided, and a plurality of external supply sits may also be provided. In particular, the plural fuel cells 10 and the plural external supply sites may be linked in association with generation and supply of electric power in accordance with operation ranges thereof.

As illustrated in FIG. 1, the valve module 20 may include an oxygen supply system 2$a$ and a hydrogen supply system 2$b$. The oxygen supply system 2$a$ may include an oxygen fuel line 2$a$-1, through which oxygen fuel may be supplied to a cathode of the fuel cell 10. A filter 2$a$-2, an air compressor 2$a$-3, a humidifier 2$a$-4 and an oxygen valve 2$a$-5 may be provided at the oxygen fuel line 2$a$-1. In the present invention, removal of an oxide film may be achieved through supply and discharge of oxygen fuel.

Accordingly, control operation for opening and closing of the oxygen valve 2$a$-5 included in the valve module 20 may be performed. In addition, the hydrogen supply system 2$b$ may include a hydrogen tank 2$b$-2, a circulation pump 2$b$-3, a hydrogen valve 2$b$-4, etc., provided at a hydrogen fuel line 2$b$-1 included in the hydrogen supply system 2$b$.

Meanwhile, the inverter 30 may be incorporated in an electric power meter 3. In particular, in addition to the inverter 30, the electric power meter 3 may include a direct current/direct current (DC/DC) converter 3-1, a battery 3-2, auxiliary machinery 3-3, a current sensor 3-4 and a voltage sensor 3-5. The system unit 40 may be incorporated in the inverter 30. Particularly, the inverter 30 may be configured to perform consumption of electric power through conversion of electric power supplied from the fuel cell 10. In accordance with the present invention, electric power consumption is not achieved using a passive element such as a resistor, but is achieved through electric power conversion of the inverter 30. The inverter 30 may be configured to convert electric power supplied from the fuel cell 10 into an output value according to oxide film removal.

The present invention is adapted to recover performance of the fuel cell 10 through the fuel cell system as described above. Accordingly, the controller 50 may be configured to determine whether oxide film removal from the fuel cell 10 should be executed based on electric power generated from the fuel cell 10. Particularly, when electric power generated from the fuel cell 10 is low, the controller 50 may be configured to determine that performance of the fuel cell 10 has been degraded and, as such, perform control for oxide film removal. The controller may also be configured to determine whether an output converted by the inverter 30 through conversion of electric power supplied to the inverter 30 after being generated from the fuel cell 10 is equal to or less than a predetermined value, to determine whether oxide film removal should be executed.

In other words, when an oxide film is formed on a platinum surface of the fuel cell 10, the activation area of the fuel cell 10 is reduced and, therefore, reaction resistance increases, thereby degrading electric power generation efficiency. In particular, electric power generated from the fuel cell 10 is reduced and, thus, the output converted by the inverter 30 through electric power conversion is reduced. Accordingly, the controller may be configured to determine whether an output converted by the inverter 30 through electric power conversion is equal to or less than the predetermined value and, as such, may be configured to determine whether oxide film removal should be executed. Particularly, the predetermined value may be an experimental value derived through an experiment as a value representing degradation of the electric power generation efficiency of the fuel cell 10 caused by formation of an oxide film on the platinum surface.

In response to determining execution of oxide film removal, as described above, the controller 50 may be configured to operate the valve module 20 to prevent supply and discharge of oxygen fuel associated with the fuel cell 10 and, as such, hydrogen may be supplied to the cathode of the fuel cell 10, thereby removing the oxide film formed on the platinum surface. In other words, oxide film removal is a reduction reaction to produce electrons. When the reduction reaction is performed at a reduced voltage, there may an advantage in association with oxide film removal. Accordingly, electrochemical reaction at the catalyst layer is transitioned from an oxidation reaction zone to a reduction reaction zone under the condition that the voltage of electric power generated from the fuel cell 10 is decreased and, as such, activity of the catalyst may be recovered through oxide film removal.

In addition, simultaneously with conversion of electric power through the inverter 30, the controller 50 may be configured to operate the system unit 40 to prevent electric power converted by the inverter 30 from being supplied to the external supply site. In other words, during recovery of activity of the catalyst according to oxide film removal, the inverter 30 may be operated to convert electric power generated from the fuel cell 10 into a predetermined output value for oxide film removal. Accordingly, electric power generated during oxide film removal may be effectively consumed through the inverter 30.

When hydrogen fuel is supplied alone in a state in which supply of oxygen fuel to the fuel cell 10 is prevented, the voltage of the fuel cell 10 may be decreased by the inverter 30, and electric power generated from the fuel cell 10 may be consumed in the inverter 30 through electric power conversion. In other words, consumption of electric power generated from the fuel cell 10 is not achieved using a passive element such as a resistor, but is achieved through electric power conversion of the inverter 30. At this time, the system unit 40 may be operated to prevent supply of electric power to the external supply site. Since a plurality of the fuel cells 10 and the external supply sites may be provided to be linked in association with generation and supply of electric power, the external supply site connected to the fuel cell 10, for which a recovery process is executed, may be configured to temporarily receive electric power from one of the remaining fuel cells 10. After completion of oxide film removal, normal generation and supply of electric power may be performed.

Meanwhile, the controller 50 may be configured to receive, as an input thereof, information regarding the voltage of electric power generated from the fuel cell 10 from the voltage sensor after execution of oxide film removal. When the voltage of the generated electric power is greater than a predetermined reference voltage value, the controller 50 may be configured to stop execution of oxide film removal, and normally operate the fuel cell 10. Particularly, the reference voltage value predetermined by the controller 50 may be a voltage value experimentally determined at a time when oxide film removal is completed. Otherwise, an open circuit voltage (OCV) may be set to the reference voltage value.

Accordingly, when the voltage of electric power generated from the fuel cell 10 is equal to or greater than the predetermined reference voltage value, the controller 50 may be configured to determine that an oxide film has been removed from the platinum surface. In this state, the controller 50 may be configured to stop operation for oxide film removal, and perform control for normal operation of the fuel cell 10. Accordingly, the inverter 30 may be switched from a driving state for oxide film removal to a normal driving state for supply of electric power to the external supply site.

In particular, when the voltage of electric power generated from the fuel cell 10 is greater than the predetermined reference voltage value, the controller 50 may be configured to operate the inverter 30 to operate normally, and operate the valve module 20 to be opened for supply and discharge of oxygen fuel associated with the fuel cell 10. When the inverter 30 operates normally, the inverter 30 may be configured to convert electric power supplied from the fuel cell 10 into an output value as electric power to be supplied to the external supply site.

In addition, as supply and discharge of oxygen fuel associated with the fuel cell 10 is allowed, normal electric power generation according to chemical reaction between oxygen fuel and hydrogen fuel may be performed. The controller 50 may be configured to operate the system unit 40 to supply electric power converted by the inverter 30 to the external supply site and, as such, electric power generated by the fuel cell 10 may be normally supplied to the external supply site.

Meanwhile, the controller 50 may be configured to periodically perform, at intervals of a predetermined period of time, determination whether oxide film removal should be executed. Particularly, the predetermined period of time may be set by experimentally deriving a time when an oxide film is formed on the platinum surface, based on the use time or use quantity of the fuel cell 10. As oxide film removal is periodically executed at intervals of a predetermined period of time, as described above, normal operation of the fuel cell 10 may be continuously executed based on performance recovery of the fuel cell 10.

Meanwhile, as illustrated in FIGS. 2 and 3, the fuel cell recovery control method according to the present invention may include determination operation S10 for determining whether oxide film removal from a fuel cell should be executed based on electric power generated from the fuel cell; and recovery operation S20 for preventing supply and discharge of oxygen fuel in association with the fuel cell upon determining execution of oxide film removal, and converting electric power generated from the fuel cell through an inverter while preventing the electric power converted through the inverter from being supplied to an external supply site.

The determination operation S10 may include determining whether an output converted by the inverter through conversion of the electric power supplied to the inverter after being generated from the fuel cell is equal to or less than a predetermined value. When the output converted by the inverter through the electric power conversion is equal to or less than the predetermined value, execution of oxide film removal may be determined.

When electric power generated from the fuel cell is low, as described above, control according to oxide film removal may be executed. In particular, the electric power generated from the fuel cell may be supplied to the inverter, and whether an output converted by the inverter through conversion of the electric power supplied to the inverter after being generated from the fuel cell is equal to or less than the predetermined value may be determined, thereby determining whether oxide film removal should be executed.

When an oxide film is formed on a platinum surface of the fuel cell, the activation area of the platinum surface is reduced, thereby resulting in an increase in reaction resistance. In particular, the generation efficiency of the fuel cell is degraded. When the generation efficiency of the fuel cell is degraded, electric power generated from the fuel cell is reduced, thereby resulting in a reduction in the output converted by the inverter through electric power conversion. Accordingly, whether the output converted by the inverter through electric power conversion is equal to or less than the predetermined value and, as such, whether oxide film removal should be executed may be determined.

Meanwhile, the fuel cell recovery control method may further include checking operation S30 for receiving information regarding a voltage of electric power generated from the fuel cell from the voltage sensor after execution of oxide film removal in the recovery operation S20; and normal driving operation S40 for stopping execution of oxide film removal when the voltage of the electric power generated from the fuel cell is equal to or greater than a predetermined reference voltage value, and then driving the fuel cell to operate normally.

When the voltage of the electric power generated from the fuel cell is equal to or greater than the predetermined reference voltage value, the normal driving operation S40 normally operates the inverter, and allows supply and discharge of oxygen fuel in association with the fuel cell.

When the voltage of the electric power generated from the fuel cell is equal to or greater than the predetermined reference voltage value, as described above, it may be determined that an oxide film has been removed from the platinum surface. In particular, control for oxide film removal is stopped, and the fuel cell operates normally. Accordingly, the inverter may be switched from driving according to oxide film removal to a normal driving state for supply of electric power to the external supply site.

As apparent from the above description, in accordance with the fuel cell recovery control system and method configured as described above, hydrogen may be supplied to the cathode of the fuel cell stack to remove an oxide film formed on the platinum surface of the cathode. Accordingly, the performance of the fuel cell stack may be recovered based on the oxide film removal. In addition, the electric power generated during the performance recovery of the fuel cell stack is consumed in the inverter and, as such, overcharge of a battery may be prevented.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell recovery control system, comprising:
    a valve module for selectively adjusting supply and discharge of hydrogen fuel or oxygen fuel associated with a fuel cell configured to generate electric power using hydrogen fuel or oxygen fuel;
    an inverter configured to convert electric power generated from the fuel cell;
    a system unit configured to selectively supply the electric power converted by the inverter to an external supply site; and
    a controller configured to:
        determine whether to execute removal of an oxide film from the fuel cell based on the electric power generated from the fuel cell,
        operate the valve module in response to determining execution of oxide film removal, to prevent supply and discharge of oxygen fuel associated with the fuel cell,
        operate the inverter to perform electric power conversion,
        operate the system unit to prevent the electric power converted by the inverter from being supplied to the external supply site, and
        achieve electric power consumption through the electric power conversion of the inverter.

2. The fuel cell recovery control system according to claim 1, wherein the controller is configured to determine whether an output converted by the inverter through conversion of electric power supplied to the inverter after being generated from the fuel cell is equal to or less than a predetermined value, and determine execution of oxide film removal when the output converted by the inverter through the electric power conversion is equal to or less than the predetermined value.

3. The fuel cell recovery control system according to claim 1, wherein, when electric power conversion of the inverter is adjusted by the controller based on execution of oxide film removal determined by the controller, the inverter is configured to perform electric power consumption through conversion of the electric power supplied from the fuel cell.

4. The fuel cell recovery control system according to claim 1, wherein the controller is configured to receive, as an input thereof, information regarding a voltage of the electric power generated from the fuel cell from a voltage sensor after execution of oxide film removal, and stop execution of oxide film removal when the voltage of the generated electric power is equal to or greater than a predetermined reference voltage value, and then operate the fuel cell.

5. The fuel cell recovery control system according to claim 4, wherein, when the voltage of the electric power generated from the fuel cell is equal to or greater than the predetermined reference voltage value, the controller is configured to operate the inverter, and operate the valve module to be opened for supply and discharge of oxygen fuel associated with the fuel cell.

6. The fuel cell recovery control system according to claim 5, wherein, when the inverter is operated by the controller, the inverter is configured to convert the electric power supplied from the fuel cell into an output value as electric power to be supplied to the external supply site.

7. The fuel cell recovery control system according to claim 1, wherein the controller is configured to periodically determine, at intervals of a predetermined period of time, whether to execute oxide film removal.

8. A fuel cell recovery control method, comprising:
   determining, by a controller, whether to execute oxide film removal from a fuel cell based on electric power generated from the fuel cell; and
   preventing, by the controller, supply and discharge of oxygen fuel in association with the fuel cell in response to determining execution of oxide film removal, and converting electric power generated from the fuel cell through an inverter while preventing the electric power converted through the inverter from being supplied to an external supply site and achieve electric power consumption through the electric power conversion of the inverter.

9. The fuel cell recovery control method according to claim 8, further comprising:
   determining, by the controller, whether an output converted by the inverter through conversion of the electric power supplied to the inverter after being generated from the fuel cell is equal to or less than a predetermined value; and
   determining, by the controller, execution of oxide film removal when the output converted by the inverter through the electric power conversion is equal to or less than the predetermined value.

10. The fuel cell recovery control method according to claim 8, further comprising:
    checking, by the controller, for receiving information regarding a voltage of electric power generated from the fuel cell after execution of oxide film removal in the recovery; and
    stopping, by the controller, execution of oxide film removal when the voltage of the electric power generated from the fuel cell is greater than a predetermined reference voltage value, and then driving the fuel cell.

11. The fuel cell recovery control method according to claim 10, wherein, when the voltage of the electric power generated from the fuel cell is equal to or greater than the predetermined reference voltage value, the inverter is operated, and supply and discharge of oxygen fuel in association with the fuel cell is allowed.

* * * * *